US009558358B2

(12) United States Patent
Aissi et al.

(10) Patent No.: US 9,558,358 B2
(45) Date of Patent: Jan. 31, 2017

(54) RANDOM NUMBER GENERATOR IN A VIRTUALIZED ENVIRONMENT

(71) Applicant: Visa International Service Association, San Francisco, CA (US)

(72) Inventors: Selim Aissi, Menlo Park, CA (US); Taeho Kigil, Foster City, CA (US); Gyan Prakash, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 273 days.

(21) Appl. No.: 14/318,046

(22) Filed: Jun. 27, 2014

(65) Prior Publication Data

US 2015/0006601 A1 Jan. 1, 2015

Related U.S. Application Data

(60) Provisional application No. 61/840,340, filed on Jun. 27, 2013.

(51) Int. Cl.
| | |
|---|---|
| *G06F 7/58* | (2006.01) |
| *G06F 21/60* | (2013.01) |
| *H04L 9/08* | (2006.01) |
| *H04L 29/06* | (2006.01) |
| *H04W 12/04* | (2009.01) |
| *H04L 9/32* | (2006.01) |

(52) U.S. Cl.
CPC ............... *G06F 21/60* (2013.01); *G06F 7/58* (2013.01); *G06F 21/602* (2013.01); *H04L 9/0866* (2013.01); *H04L 9/0869* (2013.01); *H04L 9/3278* (2013.01); *H04L 63/08* (2013.01); *H04W 12/04* (2013.01); *H04L 2209/56* (2013.01)

(58) Field of Classification Search
CPC .................................. G06F 7/58; G06F 7/588
See application file for complete search history.

(56) References Cited

U.S. PATENT DOCUMENTS

| 5,968,141 A | 10/1999 | Tsai |
| 6,687,721 B1 | 2/2004 | Wells et al. |

(Continued)

FOREIGN PATENT DOCUMENTS

| EP | 2595423 A1 | 5/2013 |
| WO | 2012/135192 A2 | 10/2012 |

OTHER PUBLICATIONS

Arvind Seshadri et al., "Pioneer: Verifying Code Integrity and Enforcing Untampered Code Execution on Legacy Systems", SOSP'05, Oct. 23-26, 2005, 16 pages.

(Continued)

*Primary Examiner* — Chuong D Ngo
(74) *Attorney, Agent, or Firm* — Kilpatrick Townsend & Stockton LLP

(57) ABSTRACT

Techniques are described for generating high quality entropy in a software only or a hardware assisted software environment, such as a virtualized environment. Embodiments of the invention describe creating an entropy pool within the virtualized environment using multiple sources of entropy. The entropy pool may be used in creating dynamically customizable and high entropy RNG and PUF. The sources of entropy may include trusted sources, untrusted sources and entropy sources with a varied scale of trust and entropy quality associated with them.

18 Claims, 12 Drawing Sheets

(56) References Cited

U.S. PATENT DOCUMENTS

| | | |
|---|---|---|
| 7,752,616 B2 | 7/2010 | Marolia et al. |
| 8,010,587 B2 * | 8/2011 | Kumar .................... G06F 7/58 |
| | | 708/250 |
| 8,391,834 B2 | 3/2013 | Raleigh |
| 8,438,631 B1 | 5/2013 | Taylor et al. |
| 8,578,361 B2 | 11/2013 | Cassapakis et al. |
| 8,583,920 B1 | 11/2013 | Bursell |
| 8,589,557 B1 | 11/2013 | Labat et al. |
| 8,607,208 B1 | 12/2013 | Arnold et al. |
| 8,613,080 B2 | 12/2013 | Wysopal et al. |
| 8,635,272 B2 | 1/2014 | Reisman |
| 2002/0178370 A1 | 11/2002 | Gurevich et al. |
| 2004/0039762 A1 | 2/2004 | Hars |
| 2006/0070066 A1 | 3/2006 | Grobman |
| 2006/0150254 A1 | 7/2006 | Siukonen |
| 2007/0118880 A1 | 5/2007 | Mauro |
| 2008/0276298 A1 | 11/2008 | Leterrier et al. |
| 2009/0006854 A1 | 1/2009 | Alkove et al. |
| 2009/0165086 A1 | 6/2009 | Trichina et al. |
| 2009/0307705 A1 | 12/2009 | Bogner |
| 2010/0106756 A1 * | 4/2010 | Ellison .................... G06F 7/58 |
| | | 708/212 |
| 2010/0195829 A1 * | 8/2010 | Blom ..................... G01S 19/14 |
| | | 380/255 |
| 2011/0047545 A1 * | 2/2011 | Ellison .................... G06F 7/588 |
| | | 718/1 |
| 2011/0264905 A1 | 10/2011 | Ovsiannikov |
| 2012/0015644 A1 | 1/2012 | Danford et al. |
| 2012/0084184 A1 | 4/2012 | Raleigh et al. |
| 2012/0102307 A1 | 4/2012 | Wong |
| 2013/0086136 A1 | 4/2013 | Inglett et al. |
| 2013/0347064 A1 | 12/2013 | Aissi |
| 2014/0033323 A1 | 1/2014 | Moroney et al. |
| 2014/0040338 A1 | 2/2014 | Van Der Sluis et al. |

OTHER PUBLICATIONS

Andrew Regenscheid, "Roots of Trust in Mobile Devices", ISPAB, Feb. 2012, 5 pages.

* cited by examiner

RANDOM NUMBER GENERATOR IN A VIRTUALIZED ENVIRONMENT

CROSS-REFERENCES TO RELATED APPLICATIONS

This application is a non-provisional application and claims the benefit of priority of U.S. Provisional Application No. 61/840,340 titled "SECURE CONTAINER," and filed on Jun. 27, 2013, which are herein incorporated by reference in their entirety for all purposes.

BACKGROUND

Aspects of the disclosure relate to computing technologies. In particular, aspects of the disclosure relate to mobile computing device technologies, such as systems, methods, apparatuses, and computer-readable media for providing a robust Random Number Generator (RNG) and/or Physical Unclonable Functions (PUF).

In many instances, security and cryptographic strength of an operating environment depends on the entropy associated with the randomness used in the cryptographic algorithms and security protocols. To meet the cryptographic assurance and capabilities high entropy Random Number Generators (RNG) and Physical Unclonable Functions (PUF) are desirable.

Providing high entropy and quality RNG and PUF functionality in software is difficult. The problem of providing one or more high entropy and secure RNG and PUF in a secure container implemented in software is exasperated by the isolation properties in a virtualized environment. For example, a secure container implemented as a virtualized sandbox may virtualize all hardware resources obfuscating many sources of entropy and create a highly predictable (nonrandom) environment. Furthermore, the operating environment that the secure container is implemented in, if malicious, may spoof the entropy sources to significantly weaken the cryptographic routines and security protocols associated with the secure container.

Embodiments of the invention address these and other problems.

BRIEF SUMMARY

Systems, methods, apparatuses, and computer-readable media are described for providing a robust Random Number Generator (RNG) and/or Physical Unclonable Functions (PUF). For example, techniques described herein allow for a software implementation of a random number generator and/or a physical unclonable function.

Embodiments of the invention describe generating high quality entropy in a software only or a hardware assisted software environment, such as a virtualized environment. Embodiments of the invention describe creating an entropy pool within the virtualized environment using multiple sources of entropy. The entropy pool is used in creating customizable and high entropy RNG and PUF. The sources of entropy may include trusted sources, untrusted sources and entropy sources with a varied scale of trust and entropy quality associated with them. The entropy pool may be based on de-sensitized attributes, events and other sources that may be measured and post-processed by the RNG/PUF system.

In one implementation, the entropy pool aggregates together the entropy from one or more entropy sources to provide a tamper-resistant and robust source of entropy for the RNG and PUF functions. The entropy sources may include virtualization events, such as VMentries and VMexits. Entropy sources may also include system events, hardware attributes or OS visible sources. Additionally, in some embodiments mechanisms may be provided for measuring and testing the entropy implemented to determine the quality of the entropy. For example, a National Institute of Standards and Technology (NIST) test suite may be integrated in the RNG/PUF system to provide a measurement of the quality of the entropy being generated within the secure container.

Certain example methods for performing embodiments described herein may include receiving input from a plurality of entropy sources, determining past entropy using one or more past random numbers and generating a random number using the input from at least one entropy source from the plurality of entropy sources and the past entropy. In certain implementations, the random number is generated in a virtualized environment. In certain aspects, generating the random number may further include selecting at least one entropy source from the plurality of entropy sources based on a comparison between an entropy threshold and the past entropy. In certain aspects, generating the random number may further include selecting a hashing mechanism from processing the at least one entropy number. In certain implementations, the entropy threshold is provided by the application, such as a payment application.

In certain embodiments, the entropy source may be a virtualization event, such as a VMexit or VMenter or a secure communication channel, where the entropy is received through the secure communication channel from a second device.

In certain aspects, the input from the at least one entropy source comprises multiple inputs from the at least one entropy source accumulated over a period of time. In one implementation, determining the past entropy may include providing a standardized entropy evaluation suite with the one or more past random numbers. In one implementation, determining the past entropy may include determining the distance between the one or more past random numbers.

An example device comprising a processor, a computer readable medium coupled to the processor, the computer readable medium comprising code, executable by the processor for implementing a method, as described above, may include receiving input from a plurality of entropy sources, determining past entropy using one or more past random numbers and generating a random number using the input from at least one entropy source from the plurality of entropy sources and the past entropy. In certain implementations, the random number is generated in a virtualized environment.

In certain aspects, the input from the at least one entropy source comprises multiple inputs from the at least one entropy source accumulated over a period of time. In one implementation, determining the past entropy may include providing a standardized entropy evaluation suite with the one or more past random numbers. In one implementation, determining the past entropy may include determining the distance between the one or more past random numbers.

The foregoing has outlined rather broadly the features and technical advantages of examples according to the disclosure in order for the detailed description that follows to be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

DETAILED DESCRIPTION

Figure 1:
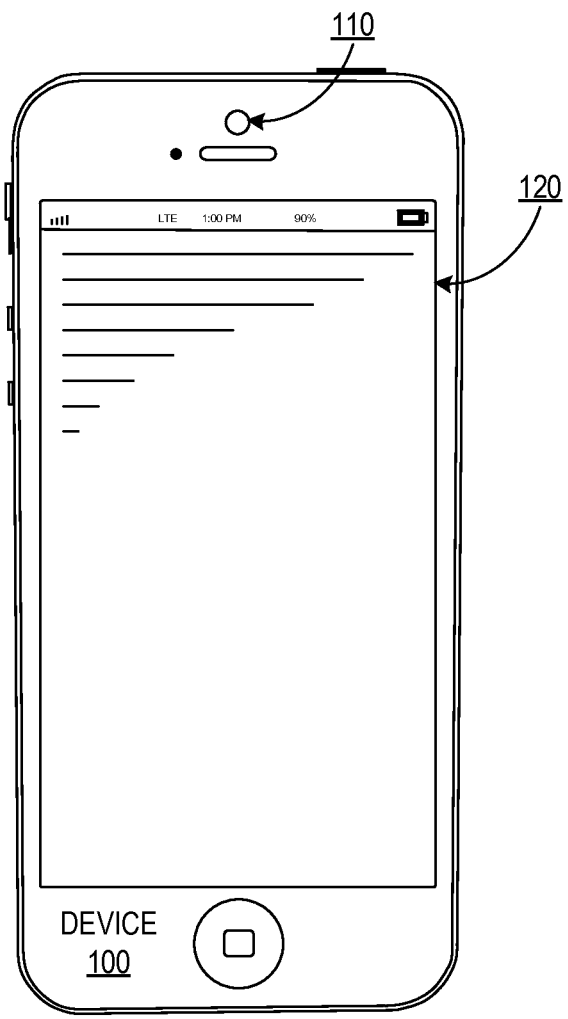
FIG. 1 is an example device that may implement various embodiments of the present disclosures.

Systems, methods, apparatuses, and computer-readable media are described for providing a robust Random Number Generator (RNG) and/or Physical Unclonable Functions (PUF). For example, techniques described herein allow for a software implementation of a random number generator and/or a physical unclonable function.

In many instances, security and cryptographic strength of an operating environment depends on the entropy associated with the randomness used in the cryptographic algorithms and security protocols. To meet the cryptographic assurance and capabilities, high entropy Random Number Generators (RNG) and Physical Unclonable Functions (PUF) are desirable.

In one aspect, the RNG may be used for generating cryptographic keys and seeds for cryptographic routines and PUFs may be used for generating non-cloneable identifiers. A RNG may refer to a function designed to generate a sequence of numbers or symbols that lack any pattern, i.e. appear random. On the other hand, PUF is a function that is easy to evaluate but hard to predict. PUF is the analog of a one-way function. In some implementations, rather than embodying a single cryptographic key, PUFs implement challenge-response authentication. For example, when a stimulus is applied to the structure, a PUF may react in an unpredictable (but repeatable) way. The applied stimulus is called the challenge, and the reaction of the PUF is called the response. Unclonability means that each PUF device has a unique and unpredictable way of mapping challenges to responses. Traditionally, both RNGs and PUFs are implemented using hardware resources.

Providing high entropy and quality RNG and PUF functionality in software is difficult. The problem of providing one or more high entropy and secure RNG and PUF in a virtualized environment implemented in software is exasperated by the isolation properties of the secure container. For example, a secure container implemented as a virtualized sandbox may virtualize all hardware resources obfuscating many sources of entropy and create a highly predictable (nonrandom) environment.

Embodiments of the invention describe generating high quality entropy in a software only or a hardware assisted software environment, such as a virtualized environment. Embodiments of the invention describe creating an entropy pool within the virtualized environment using multiple sources of entropy. The entropy pool is used in creating customizable and high entropy RNG and PUF. The sources of entropy may include trusted sources, untrusted sources and entropy sources with a varied scale of trust and entropy quality associated with them. The entropy pool may be based on de-sensitized attributes, events and other sources that may be measured and post-processed by the RNG/PUF system.

In one implementation, the entropy pool aggregates together the entropy from one or more entropy sources to provide a tamper-resistant and robust source of entropy for the RNG and/or PUF. The entropy sources may include virtualization events, such as VMentries and VMexits. Entropy sources may also include system events, hardware attributes or OS visible sources. Additionally, in some embodiments mechanisms may be provided for measuring and testing the entropy implemented to determine the quality of the entropy. For example, a National Institute of Standards and Technology (NIST) test suite may be integrated in the RNG/PUF system to provide a measurement of the quality of the entropy being generated within the virtualized environment.

Techniques described herein are advantageous since they provide a virtualized, but still robust RNG & PUF in a software only tamper resistant and tamper evident environment. The RNG/PUF system is capable of measuring the quality of the entropy, calibrating the sample rate or control measures of the entropy and selecting the entropy source.

Prior to discussing embodiments of the invention, description of some terms may be helpful in understanding embodiments of the invention.

As discussed herein, a "mobile device" may comprise any electronic and/or communication device that may be transported and operated by a user, which may also provide remote communication capabilities to a network. Examples of mobile devices include mobile phones (e.g. cellular phones), PDAs, tablet computers, net books, laptop computers, personal music players, hand-held specialized readers, etc.

"random number" may refer to a numeric sequence that cannot be easily guessed or predicted. For example, a random number may not have any recognizable patter or regularities. Some random numbers may be categorized as pseud-random numbers based on the source of entropy used in generating the random numbers or/and the quality of the entropy associated with the random number.

"Random Number Generator" (RNG) may refer to a function, module, or component designed to generate a sequence of numbers or symbols that lack any pattern, i.e. appear random.

"Physical Unclonable Function" (PUF) may refer to a function that is easy to evaluate but hard to predict. PUF may be the analog of a one-way function. In some implementations, rather than embodying a single cryptographic key, PUFs implement challenge-response authentication. When a stimulus is applied to the structure, the PUF may react in an unpredictable (but repeatable) way. The applied stimulus is called the challenge, and the reaction of the PUF is called the response. Unclonability may refer to the property that each PUF device has a unique and unpredictable way of mapping challenges to responses.

"Entropy" may refer to a measure of uncertainty in a random number or value. In other words, "entropy" may refer to the randomness of a random number. A random number with a high entropy cannot be easily guessed or predicted. For example, a fair coin toss has a high entropy since the probability of the outcome is highly uncertain. In certain embodiments, entropy may refer to the Shannon entropy and may be defined using the Boltzmann's H-theorem. Entropy may be measured in bits, nats or bans.

"Entropy source" may refer to any device, event, or channel that may prove as a source of randomness for generating the random number. Examples of entropy sources may include, but are not limited to, user interaction with the device, network noise, asynchronous events, etc.

"Entropy threshold" may refer to a desired threshold for entropy from a system for the generation of the random number. For example, entropy associated with a random number or a plurality of random numbers above an entropy threshold may indicate a high quality entropy. In another example, entropy below a certain entropy threshold may indicate a pseudo random number. In another example, entropy below a certain threshold may indicate that the random number generated by the system can be used as if the number was generated by a PUF.

A "server computer" may typically be a powerful computer or cluster of computers. For example, the server computer can be a large mainframe, a minicomputer cluster, or a group of servers functioning as a unit. In one example, the server computer may be a database server coupled to a web server.

A "user" may be an entity, such as, an individual that may be associated with one or more payment accounts and/or mobile devices. The user may request different levels of security desired by the user or directly configure a threshold or level of entropy that the user desires for specific cryptographic operations.

A "trusted execution environment" (TEE) may be a secure environment on the computing device for securely executing an application. A trusted execution environment may be supported in software, hardware, firmware or a combination thereof. The trusted execution environment may be implemented so that its execution and data space are isolated from other environments executing code on the computing device. For example, the trusted execution environment may have dedicated or protected processing and system resources, such as secure storage and protected memory buffers. In some implementations, a trusted execution environment may have paging structures, exception handlers, protected memory regions and hardware resources dedicated or associated with the trusted execution environment. A trusted execution environment is not limited to but may be implemented using one or more trusted execution environments that may include a secure element, SIM/UICC card, or virtualization technology.

A "hashing mechanism" may refer to the use of a hashing function that can be used to map data of arbitrary size to data of fixed size, with slight differences in input data producing very big differences in output data. The values returned by a hash function are called hash values, hash codes, hash sums, or simply hashes. Hash functions are widely used to generate fixed-length output data. Well known examples of hashing mechanisms include, but are not limited to, SHA-1 (Secure Hash Algorithm-1) and SHA-256 (Secure Hash Algorithm-256) and Message Digest (MD).

An "operating system" (OS) may be a collection of software that manages computer hardware resources and provides common services for applications. The operating system is a vital component of the system software in a computer system. Applications usually require an operating system to function.

A "network stack" may be an implementation of a networking protocol used for communicating between any two devices. In some implementations, the operating system implements one or more network stacks for communicating with a network, wherein the network comprises of one or more computing devices. An example of a networking protocol is the open standards interface (OSI) networking protocol. A network stack may be capable of communicating over a variety of wired and wireless protocols, such as Ethernet, 3GPP, 3GPP2, CDMA, LTE, Bluetooth, NFC, etc.

A "security sensitive application" may include any application executing on a device that manages sensitive data associated with the user, such as a payment account. Sensitive data may include sensitive information, such as Personal Account Information (PAI) and Personal Identifying Information (PII). Examples of PAI data may include account numbers, such as Personal Account Numbers (PAN) associated with a payment device. Example of PII data may include social security numbers, names, birth dates, etc.

A "secure communication channel" may be a networking channel between two entities, such as a server computer and mobile device, that may allow the two entities to communicate with each other through a secure channel without eves dropping by a third entity, spoofing of the communication by a third entity or masquerading of the third entity as one of the two expected entities participating in the secure communication. Setting up a secure communication channel allows sensitive information such as credit card numbers, social security numbers, login credentials and signaling information for managing the trusted execution environment to be transmitted securely between the two entities. Known techniques, such as secure socket layer (SSL) protocols may be used in establishing a secure communication channel.

A "virtualized environment" may provide isolation between different operating environments sharing the same physical resources. In other words, a virtualized environment provides a logical abstraction of computing resources from physical constraints. One common abstraction is referred to as a virtual machine (also known as guest), or VM, which provides the content running in the VM a direct interface to the physical hardware while maintaining the abstraction. Virtualization technology allows multiple VMs running on the same physical hardware to operate independently and isolated from each other. The one or more VMs on the system are managed by a Virtualized Machine Monitor, or VMM (also known as hypervisor or host). The VMM is a software or firmware layer responsible for hosting and managing virtual machines. The VMM manages the system's processor, memory, and allocates other resources for each VM.

"Virtualization events" may refer to events on a system that may occur while operating a virtualized environment. In some instances, virtualization events may be transition events that may cause the operating state of the processing entity to transition from the virtual machine monitor to the virtual machine or vice versa. Examples of virtualization events may include VMexits and VMenters. VMexits and VMenters mark the transition of the execution between the VMM and the VM. Virtualization events may result from system interrupts, exceptions, accessing of privileged resources from an unprivileged environment, etc.

"Cloud computing" or "Cloud" may refer to use of computing resources (hardware and/or software) which are available in a remote location and accessible using network resources. Hardware and software resource may include, but are not limited to, one or more server computers, databases, routers, operating system and applications. In some implementations, users are able to buy/loan these computing resources (including storage and computing power) as a utility, on demand.

A "payment processing network" may include data processing subsystems, networks, and operations used to support and deliver certificate authority services, authorization services, exception file services, and clearing and settlement services. An exemplary payment processing network may include VisaNet™. Payment processing networks such as VisaNet™ are able to process credit card transactions, debit card transactions, and other types of commercial transactions. In some implementations, the payment processing network may securely interact with the RNG/PUF system resident on the mobile device using a secure communication channel for providing a robust source of entropy. The payment processing network may include a server computer. The payment processing network may use any suitable wired or wireless network, including the Internet.

A "mobile operating network" may be a radio network distributed over land areas called cells, each served by at least one fixed-location transceiver, known as a cell site or base station. When joined together these cells may provide radio coverage over a wide geographic area. This enables a large number of mobile devices to communicate with each other and with fixed devices anywhere in the network, via base stations.

Referring to FIG. 1, example computing device 100 may be configured to implement one or more aspects of the disclosure. For example, computing device 100 may be a mobile device. As discussed herein, a "mobile device" may comprise any electronic device that may be transported and operated by a user, which may also provide remote communication capabilities to a network. The mobile device may be configured to receive a secure and robust source of entropy from a server computer. The server computer may be hosted by a payment processing network, a mobile operating network or a cloud computing service. Examples of mobile devices include mobile phones (e.g. cellular phones), PDAs, tablet computers, net books, laptop computers, personal music players, hand-held specialized readers, etc. In some embodiments, computing device 100 may also include a desktop computer, a gaming machine, a stationary sensor or camera, or a system of machines coupled together wirelessly or wired. Computing device 100 may be equipped with, be communicatively coupled to, and/or otherwise include one or more front-facing 110 or back facing cameras, mono-lens cameras, depth cameras, laser sensors, sonar sensors, and/or other sensors. The mobile device may also include one or more user interfaces for interacting with the device. For example, the mobile device may include a touchscreen 120 that the user may interact with to input data. In some embodiments, user interfaces, such as the touchscreen may also provide entropy for generating random numbers. In addition to including one or more sensors, computing device 100 may also include one or more processors, memory units, and/or other hardware components, as described in greater detail below. In one implementation, the computing device 100, shown in FIG. 1 may be implemented using one or more components described in more detail in FIG. 12.

Figure 2:
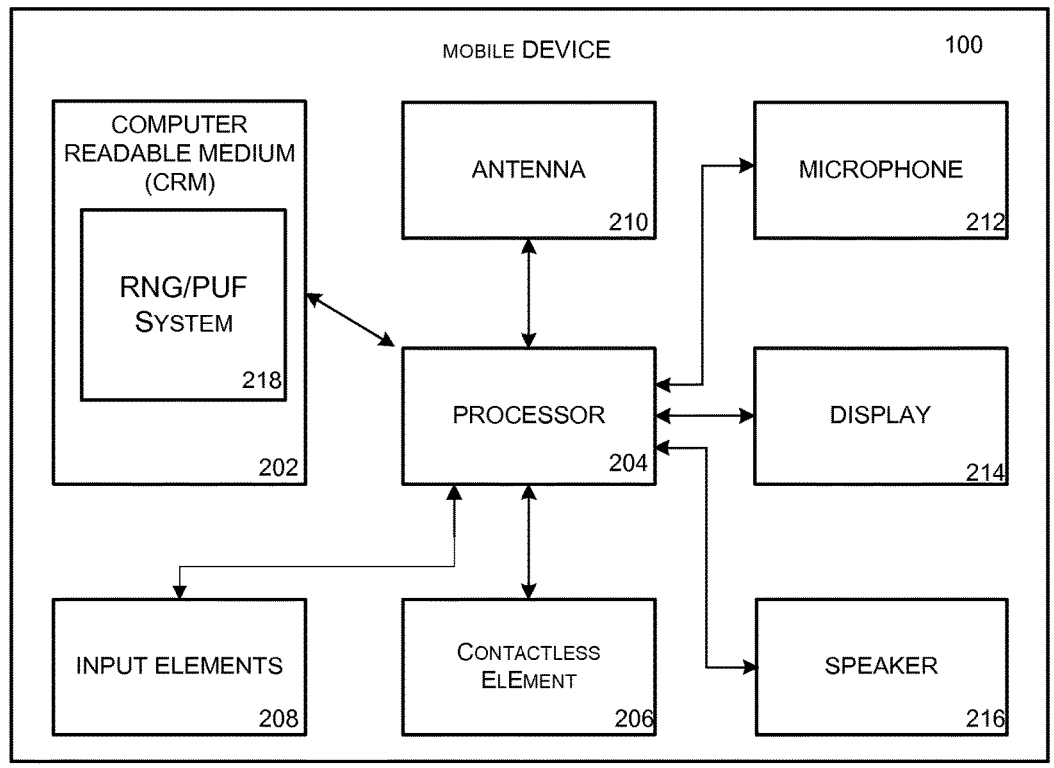
FIG. 2 shows an exemplary computer readable medium for the mobile device discussed in FIG. 1, in accordance with some embodiments.

FIG. 2 illustrates at least some of the elements of an exemplary mobile device 100 in accordance with embodiments of the invention. The mobile device 100 may comprise a computer readable medium 202, an antenna 210, a microphone 212, a display 214, a speaker 216, a contactless element 206, and input elements 206 and these may all be operatively coupled to a processor 204.

The mobile device 100 may be a payment device that may be used to make payments, conduct a transaction, a communication device to allow a user to log on to a website and download an application, etc. The mobile device may download and run security sensitive applications. The exemplary mobile device 100 may comprise a computer readable medium (CRM) 202 comprising code executable by the processor 204 for implementing methods using embodiments of the invention. For example, the CRM 202 may comprise the RNG/PUF system 218 for at least generating robust random numbers. The computer readable medium 202 may be in the form of a memory that stores data and could be internal to the device or hosted remotely (i.e., cloud) and accessed wirelessly by the device. A contactless element 206 may be capable of transmitting and receiving wireless data or instructions using a short range wireless communications capability.

Figure 3:
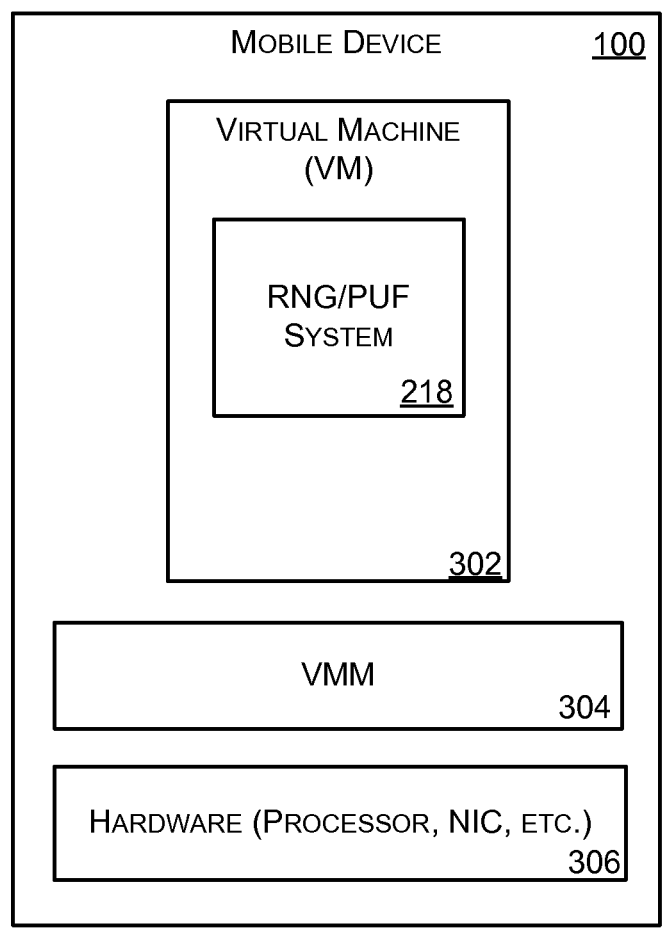
FIG. 3 illustrates a virtualized environment executing on the device according to certain embodiments of the present disclosure.

As shown in FIG. 3, in one implementation, virtualization technology may be deployed on the mobile device 100. Virtualization technology may be used for providing isolation between different operating environments sharing the same physical and hardware resources 306, such as processor, NIC, etc. One common abstraction is referred to as a virtual machine 302 (also known as guest), or VM 302. Virtualization technology allows multiple VMs running on the same physical hardware to operate independently and isolated from each other. The one or more VMs on the system are managed by a Virtualized Machine Monitor 304, or VMM 304 (also known as hypervisor or host). The VMM 304 is a software or firmware layer responsible for hosting and managing virtual machines. The VMM 304 manages the system's processor, memory, and allocates other resources for each VM 302.

The problem of providing one or more high entropy and secure RNG and PUF in a virtualized environment implemented in software is exasperated by the isolation properties of the virtualized environment. For example, a virtual machine implemented as a virtualized sandbox may virtualize all hardware resources obfuscating many sources of entropy and create a highly predictable (nonrandom) environment. Embodiments of the invention describe a RNG/PUF system 218 that is loaded and executed inside the virtual machine (VM). In some embodiments, the RNG/PUF system 218 may execute within a trusted execution environment (not shown) created using a virtualized environment.

Figure 4:
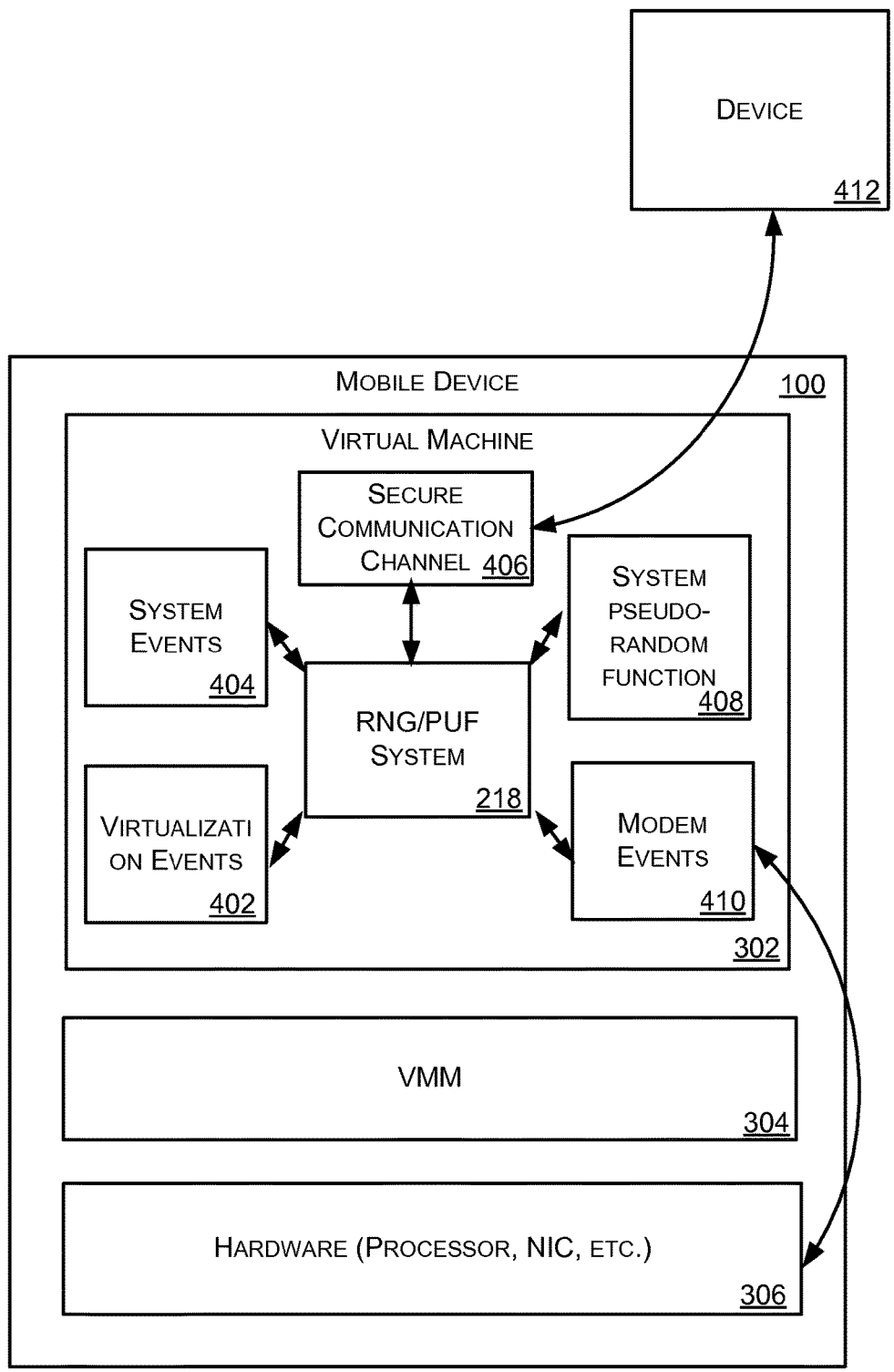
FIG. 4 illustrates several sources of entropy in a virtualized environment according to certain embodiments of the present disclosure.

FIG. 4 illustrates a plurality of example entropy sources utilized by embodiments of the invention. As shown in FIG. 4, according to certain embodiments of the invention, the RNG/PUF system 218 may be configured to receive input from a variety of entropy sources, such as virtualization events 402, system events 404, secure communication channel 406, system pseudo-random function (e.g., /dev/random/ events) 408, or modem events 410.

In some embodiments, events such as Virtualization events 402 may provide an additional source of entropy. Examples of Virtualization events 308 include VMexits and VMenters. VMexits and VMenters mark the transition of the execution between the VMM 304 and the VM 302. As previously discussed, the VM 302 provides the abstraction and is hosted by the VMM 304. The VMM 304 executes at a higher privilege than the VM 302 and manages critical tasks and resources, such as the system's processor, interrupts, memory, and allocates other resources for the VM 302.

Figure 5:
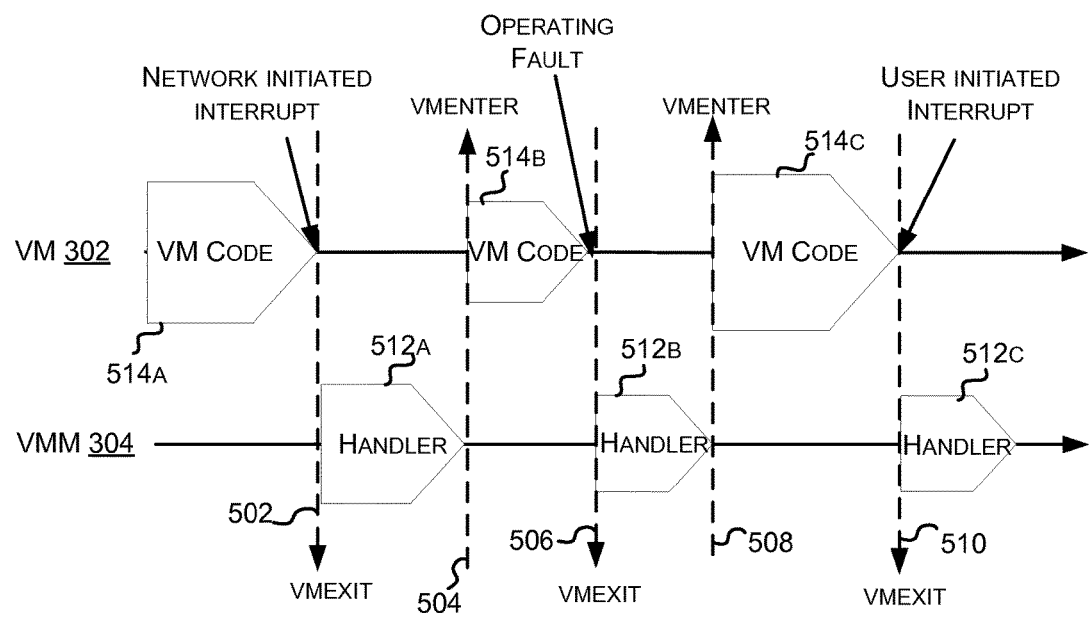
FIG. 5 illustrates a timeline with examples of virtualization events according to certain embodiments of the present disclosure.

FIG. 5 visually illustrates the execution of the VMM 304 and the VM 302 over an example period of time. Blocks 514a, 514b and 514c illustrate periods during which code belonging to the VM 302 may be executing from memory on one or more processors. Conversely, blocks 512a, 512b and 512c represent periods during which the code belonging to the VMM 304 (such as handlers) may be executing from memory on the one or more processors. In some instances, events such as interrupts, exceptions, faults, etc., may cause a VMexit (i.e., a virtual machine exit transition) from the VM 302 and transfer control to the underlying VMM 304.

For example, as shown in FIG. 5, at block 514a, the one or more processors may execute code belonging to the VM 302. During the execution of 514a, in FIG. 5, a network initiated interrupt may occur, causing a VMexit 502 that transfers control to the VMM 304. The VMM 304 may implement a handler to handle the interrupt and transfer control back to the VM 302 via a VMenter 504 (i.e., a virtual machine enter transition). The network initiated interrupt may be considered a random event, since the root of the interrupt may be so far removed from the system and effected by almost an infinite number of different system, environmental and user interaction factors that the occurrence of the network event would be considered random or close to random. For example, a message sent or a call initiated from a remote device may cause a message or call mapped to the mobile device 100 to cause the network initiated interrupt on the mobile device 100. Since such a message or call is user initiated, it would be almost impossible to predict the exact timing of initiation of such a message or call, making the timing of the event random. Furthermore, network noise, route travelled by the message/call or route conditions may all contribute to the richness of the entropy provided by the event.

Similarly, as shown in FIG. 5, the VMenter 504 causes the one or more processor to continue executing code from the VM 302, indicated by block 514b. As shown in FIG. 5, another VMexit 506 may occur during the execution of code represented by block 514b, caused by an operating fault in the VM 302. An example of such a fault may be a data corruption fault or a page fault. Such a fault may be caused by a number of indeterminable system and environmental factors. For example, a data corruption might occur due to radiation effects on the processor buffer or the storage memory, in some instances. Many other types of faults and exceptions may lead to a Vmexit. The interminable nature of these faults in causing the VMexits may provide another source of entropy to the RNG/PUF system 218.

Once the fault is handled in the VMM 304, by executing code in the VMM 304 indicated by block 5128, the VMM 304 may return control back to the VM 302 via a VMenter 508. Again, as the VM 302 executes code (block 514c), a user initiated interrupt may cause yet another VMexit 512 and transfer control to the VMM 304 for handling the interrupt. Example of such user initiated interrupts may include interrupts caused by the interaction of the user with the user-interface provided by the mobile device 100. For example, a user interacting with the touchscreen 120, starting up applications, initiating a call, etc. may all cause a VMexit 510 from the currently executing VM 302 code for the processor to handle the user request. Such user initiated interrupts are random in nature and can directly contribute to the entropy.

Although, only a few example causes and types of virtualization events are discussed above, many other events and interactions may cause virtualization events, such as VMexits and VMenters.

VM exits and VM enters inherently provide an interface for collectively indicating several classes of events. Many of these events are random in nature and cannot be predicted, providing for a robust source of entropy. In certain embodiments, the count and timing of the occurrence of the virtualization events 402 may be used as input to the RNG/PUF system 218. For example, in one embodiment, the timestamp for the VMexit may be used as input to the RNG/PUF system 218 as an entropy source. In one implementation, the VM 302 may have access to the time of occurrence of the virtualization events. In other implementations, the processor and/or the VMM 304 may be configured to provide information associated with the virtualization event 402 to the RNG/PUF system 218 operating inside the VM 302. For example, the processor may be configured to store or accumulate the timestamp at each VMexit in a memory buffer or processor register. The processor may be further configured to make the memory buffer or processor register readable by the VM 302, so that the RNG/PUF system 218 can use the virtualization event as an entropy source.

Referring back to FIG. 4, system events 404 may include other events such as interaction of the user with the mobile device 100 using a user interface that provides feedback to the user. As discussed earlier, the user interaction may be realized by the VM 302 via the virtualization event caused by the user interaction. In addition, if the VM 302 is involved in providing feedback to the user, for example through a secure input/output interface, interaction with such an interface may also provide a rich source of entropy. Such real-time interactions are difficult to falsify even in a virtualized environment. Similarly, other system events, such as system interrupts that are needed for the smooth functioning of the device are generally difficult to mask by potentially malicious piece of code without adversely affecting the user experience and thereby revealing its presence.

A secure communication channel 406 may provide another reliable and secure source of entropy to the RNG/PUF system 218. A secure communication channel 406 may connect to a device 412 using a networking stack implemented in the VMM 304 or the VM 302. A secure communication channel 406 may provide a networking channel between RNG/PUF system 218 and the device 412 and may allow the two entities to communicate with each other through a secure channel without eves dropping by a third entity, spoofing of the communication by a third entity or masquerading of the third entity as one of the two expected entities participating in the secure communication. Setting up a secure communication channel allows input providing entropy to be transmitted securely from the device 412 to the RNG/PUF 218 residing on the mobile device 102. Known techniques, such as secure socket layer (SSL) protocols may be used in establishing a secure communication channel.

In certain embodiments, the device 412 may be a server computer operating individually or as a part of a group of computer servers, such as a cloud. In one embodiment, the device 412 may be belong to a payment processing network or a mobile operating network and may include data processing subsystems, networks, and operations used to support security services on the device. Such a remote computer server may have access to rich entropy from a local hardware or software entropy or random number generator.

In certain embodiments, the mobile device 102 may communicate with a local device 412, through a short-distance protocol such as Bluetooth™ or WiFi or any other wired or wireless protocol through the secure communication channel 406 to receive entropy information. For example, a local device 412, such as a secure dongle that can provide high entropy, might be in communicable range with the mobile device 102 and the RNG/PUF system 218 may use input from the local device 412 as a source of entropy, when available.

Software running in the VM 302 may also provide entropy or a pseudo-random number using system pseudo-random function 408. Known techniques may be used for generating a pseudo-random number using software. Although, such techniques may not provide a random number with a high entropy, the random numbers provided may still be adequate for less security sensitive applications and may be used in conjunction with other techniques described in this disclosure to enhance the entropy provided by the RNG/PUF system 218.

In some instances, the VM 302 may also have access to the modem and may be able to receive asynchronous and potentially random events from the modem. In such instances, the RNG/PUF system 218 may also receive and use modem events 410 from the modem for enhancing entropy provided by the RNG/PUF system 218.

The entropy sources described above provide a few examples of various different sources of entropy that the RNG/PUF system 218 may use for enhancing entropy of the random numbers generated by the RNG/PUF system 218. However, the disclosure is not limited to these examples and may be used in conjunction with other sources of entropy from inside the virtualized environment, the hardware of the system or from a local or remote device.

Figure 6:
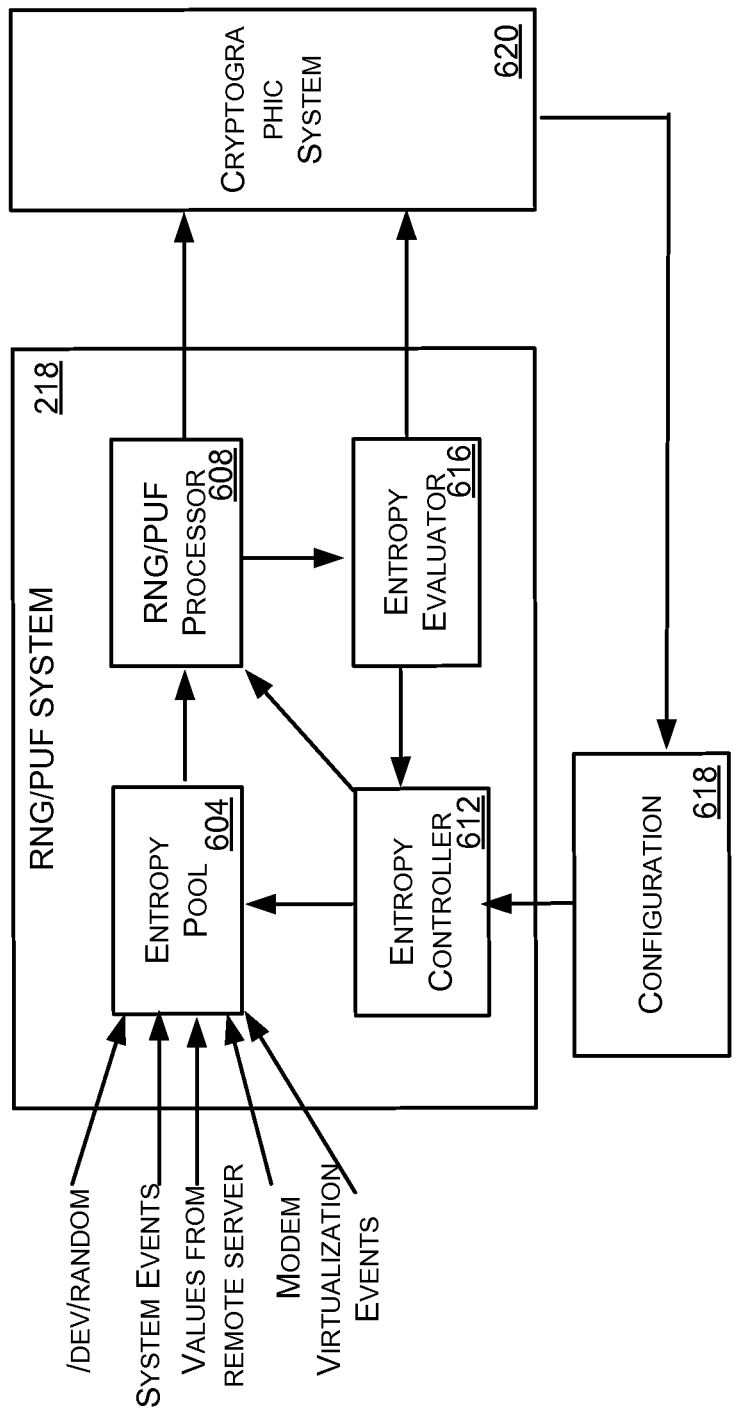
FIG. 6 illustrates a block diagram for generating high quality entropy according to certain embodiments of the present disclosure.

FIG. 6 is a block diagram that illustrates generating high quality entropy according to certain embodiments of the invention. Block 218 illustrates one example implementation of the RNG/PUF system 218. In certain embodiments, the RNG/PUF system 218 operates in a virtualized environment, such as a VM 302, on a mobile device 102. Modules described in FIG. 6 may be implemented using software, firmware, hardware or any other combination thereof. In one embodiment, the modules described in FIG. 6 may be stored as software modules on a computer-readable medium 202 that may be any magnetic, electronic, optical, or other computer-readable storage medium. In certain implementations, the computer-readable storage medium 202 may include an entropy pool 604, an RNG/PUF processor 608, an entropy controller 612, and an entropy evaluator 616. In addition, other modules, such as a cryptographic system 620 and a configuration module 618 may work in conjunction with the RNG/PUF system 218.

The entropy pool 604 module accumulates and aggregates input from various entropy sources over time. Examples of such entropy sources, as discussed previously with respect to FIG. 4, may include, but are not limited to, virtualization events 402, system events 404, secure communication channel 406, system pseudo-random functions 408 and modem events 410.

Figure 7:
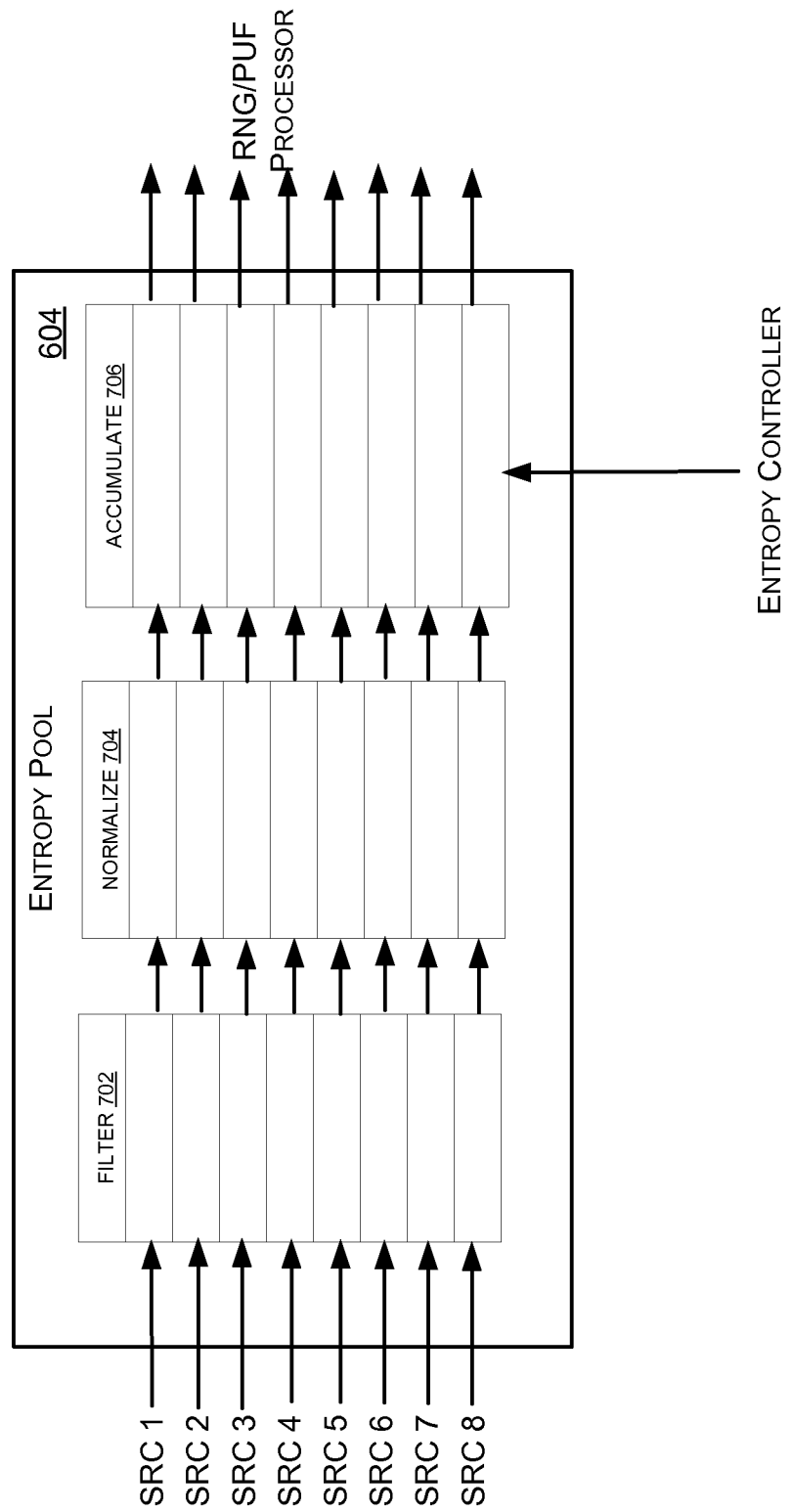
FIG. 7 illustrates an example module of FIG. 6 in more detail according to certain embodiments of the present disclosure.

FIG. 7 shows an example implementation of the entropy pool 604 module. In certain implementations, input from multiple entropy sources may be received at the entropy pool 604 module. For example, in FIG. 7, eight different entropy sources are illustrated (SRC 1, SRC 2, SRC 3, etc.). For each source, the filter 702 module may filter the received input over time and temporarily store the input. For example, for an interrupt source, the filter 702 may receive several different classes of interrupts that include synchronous (e.g., periodic) and asynchronous (e.g., non-periodic) interrupts. In one implementation, the filter 702 may be configured to filter out synchronous interrupts and only store information associated with asynchronous interrupts, since at least in some instances asynchronous interrupts may have a higher entropy associated with them. In one implementation, the filter 702 may store the timestamp associated with the arrival of the interrupt. In some implementations, the filter 702 may store timestamps for multiple interrupts before normalizing the input (at block 704). For different sources, the filter 702 may have different rules either encoded or configured (via the configuration 618 module) for filtering out information from the various sources. Another example may include filtering out virtualization events deliberately caused by code running inside the VM 302, such as VMexit causing instructions executed by code residing in the VM 302.

Next, in certain implementations, the input received from different entropy sources may be normalized with each other. For example, SRC 1 may capture the timestamp for an interrupt, whereas SRC 2 may capture the number of interrupts that occurred during a specified period (measured in time or instructions executed). The data format may be different for these two input method used by the filter 702. In one implementation, the input from each source stored in the filter 702 may be normalized (block 704) by padding (i.e., adding bits) or chopping (i.e., removing bits) of the input data to normalize the data to a fixed length output. In other implementations, the input data may be normalized by hashing the input to a fixed length output.

In certain embodiments, the normalized input data from each source may be accumulated (block 706) overtime. In some implementations, the normalized data (from block 704) for each source is hashed together with the previous data accumulated for the each source, at block 706. In other words, the new entropy input trickling in overtime for each entropy source is merged together, using techniques such various hashing mechanism. In some instances, the entropy associated with a source may improve as more entropy data is merged together or accumulated over time. In some implementations, the accumulated values are reset based on a pre-configured time. The pre-configured time may be provided by the configuration 618 module. In other implementations, the accumulated values may be reset upon generating the RNG/PUF values. In yet other implementations, the accumulated values in block 706 may be reset in a variety of ways without departing from the scope of the invention or not reset at all.

Referring back to FIG. 6, for each RNG/PUF request, the entropy controller 612 module may indicate to the entropy pool 604 module, the sources to be used in the random number generation. The accumulated data associated with the sources selected by the entropy controller 612 module may be forwarded to the RNG/PUF processor 608 by the entropy pool 604 module. The entropy controller 612 determines the appropriate sources and processing for generation of the random number by processing configuration information received from the configuration 618 module and the past entropy or quality of past entropy received from the entropy evaluator 616 module.

Figure 8:
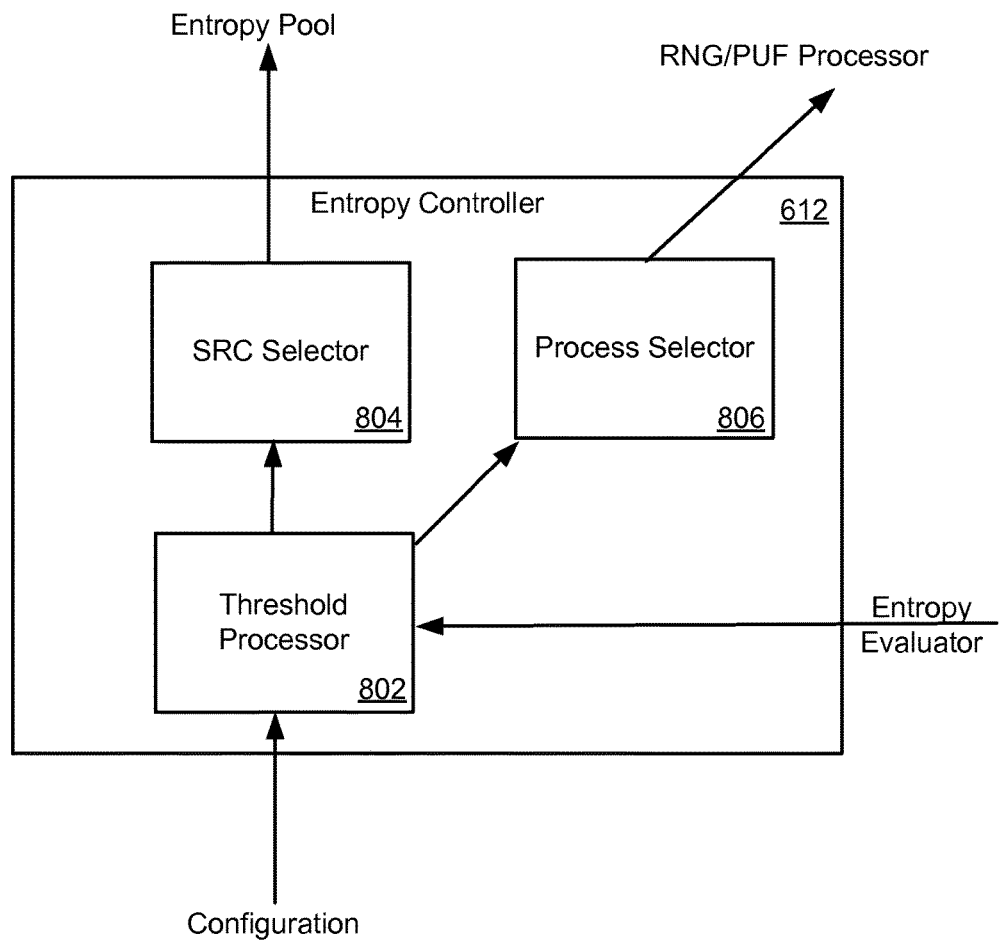
FIG. 8 illustrates another example module of FIG. 6 in more detail according to certain embodiments of the present disclosure.

Briefly referring to FIG. 8, FIG. 8 shows an example implementation of the entropy controller 612 module. In one implementation, a threshold processor 802 module receives input, such as an entropy threshold from the configuration 618 module and the past entropy from the entropy evaluator 616 module. For example, the configuration information from the configuration 618 module may require that the RNG or the PUF generate values with a pre-determined level or threshold of entropy. For example, the user may provide the configuration 618 module with a pre-determined level of entropy desired from the system. In another example, the cryptographic system 620, may provide to the configuration 618 module with the desired level of entropy or entropy threshold from the RNG/PUF module 612 for performing cryptographic operations. In one implementation, the cryptographic system 620 may used by or be part of a security sensitive application, such as payment application. In certain embodiments, the threshold processor 802 module may compare the entropy threshold received from the configuration 618 module with the past entropy for RNG and/or PUF values generated in the past.

In one implementation, if the quality of past entropy for the RNG and/or PUF values generated in the past is less than the desired level of entropy received from the configuration 618 module, the threshold processor 802 may request the SRC selector 802 and the Process selector 806 to improve entropy by selecting sources or entropy and processing of sources such that the resulting random numbers generated have a higher entropy. For example, the SRC selector 804 may request the entropy pool 604 to forward information for six sources instead of two sources to provide higher quality entropy. Similarly, in response for a request for a higher quality entropy, the process selector 806 may request the RNG/PUF processor to use a more sophisticated process. For example, the process selector 806 may request the RNG/PUF processor 608 to use a SHA (Secure Hashing Algorithm) hashing mechanism instead of a MD (Message Digest) hashing mechanism for combing entropy from several sources, in response for a request for higher entropy from the process selector 806 from the entropy control 612 module.

Referring back to FIG. 6, the RNG/PUF processor 608 may receive the accumulated information associated with the various sources (as determined by the SRC selector 804 of the entropy controller 612) from the entropy pool 604 and generate the random number value. The value from the RNG/PUF Processor 608 may be provided to the cryptographic system 620 and the entropy evaluator 616.

Figure 9:
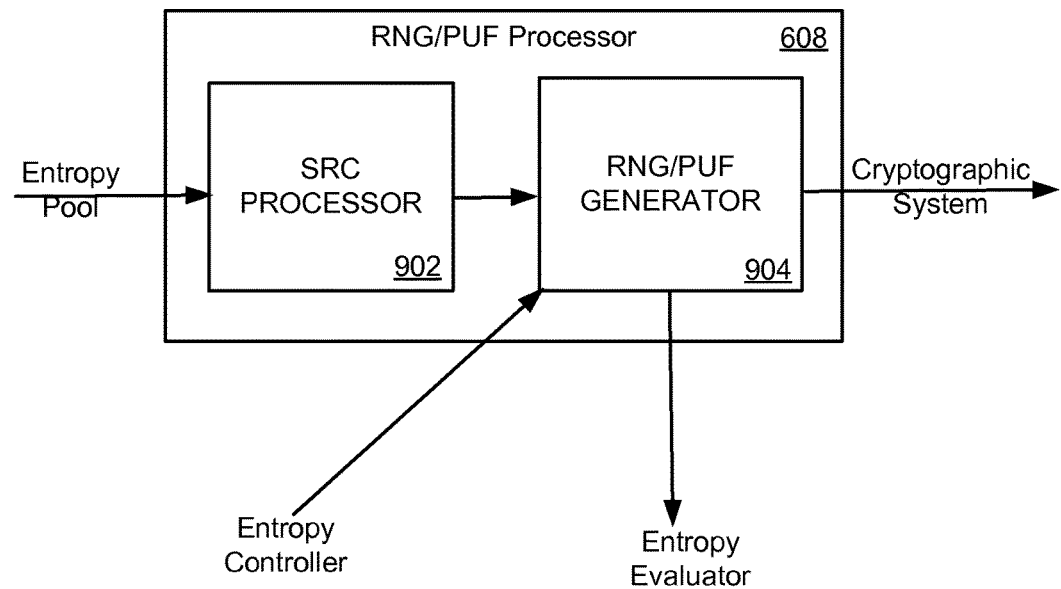
FIG. 9 illustrates yet another example module of FIG. 6 in more detail according to certain embodiments of the present disclosure.

Briefly referring to FIG. 9, the RNG/PUF Processor 608 may temporarily store the information received from the entropy pool 604 in the SRC processor 902 and generate the random number at the RNG/PUF generator 904. As discussed previously, the RNG/PUF generator 904 module may be configured to perform a number of different variants of hashing algorithms, such as MD and SHA. The selection of the hashing mechanism may be based on the process selection by the process selector 806 from the entropy controller 612 module. The RNG/PUF generator 904 uses the hashing mechanism to combine the information from the multiple sources from the SRC processor 902 and provide a fixed length string value that may be used as the random number. The random number generated by the RNG/PUF generator 904 may be provided to both the Cryptographic system 620 and the entropy evaluator 616.

As shown in FIG. 6, the entropy evaluator 616 receives the last generated random number from the RNG/PUF processor 608 and evaluates the quality of the random numbers. In certain implementations, the entropy evaluator 616 module may determine the entropy of past random numbers using the last random number or using multiple random numbers generated by the RNG/PUF processor 608 over a period of time.

Figure 10:
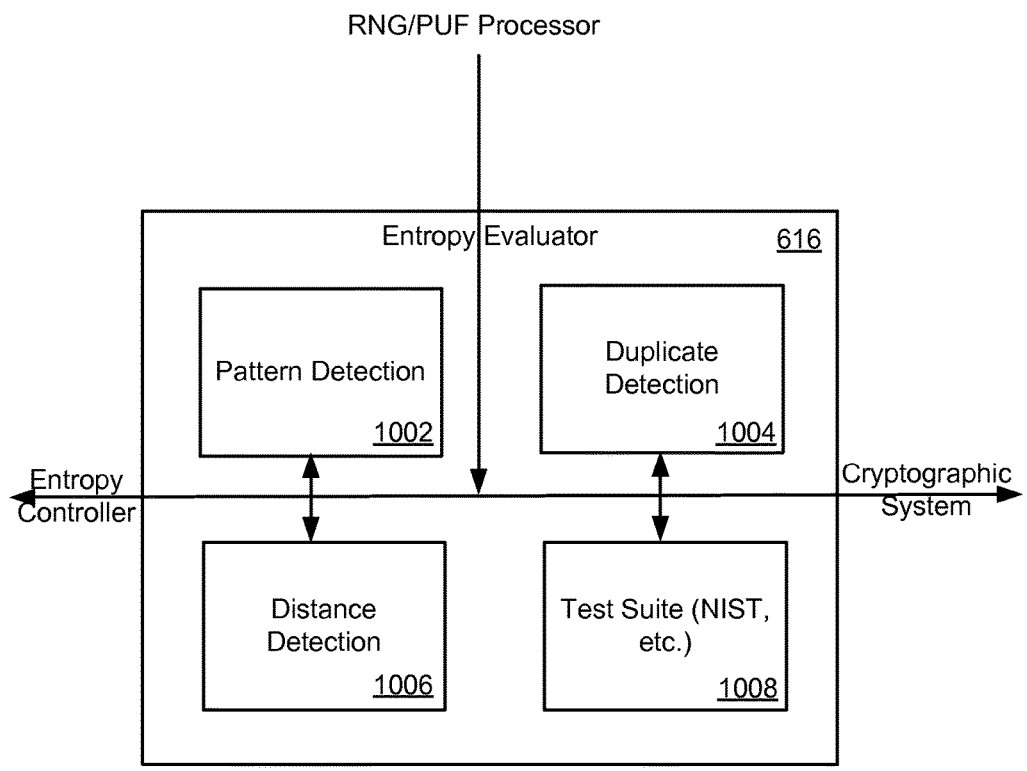
FIG. 10 illustrates yet another example module of FIG. 6 in more detail according to certain embodiments of the present disclosure.

Briefly referring to FIG. 10, the entropy evaluator 616 module may determine the quality of the entropy of random numbers generated in the past by the RNG/PUF Processor 608. The entropy evaluator 616 may use one or more known and/or novel techniques, in combination or separately, for determining the appropriate entropy associated with the one or more past random numbers, without deviating from the scope of the invention.

FIG. 10 provides several example techniques for determining the quality of the random numbers generated by the RNG/PUF processor 608, such as the pattern detection 1002 module, the duplication detection 1004 module, the distance detection 1006 module and the test suite 1008 module. For example, the pattern detection module 1002 may analyze several random number values generated by the RNG/PUF processor 608 module and identify if the RNG/PUF processor 608 may be generating identifiable patterns within the random number or over several random number generations. The duplicate detection 1004 module may detect duplication of numbers or sequence of numbers within the random number generation or several random number generations. The distance detection 1006 module may determine the distance between the numbers generated by the RNG/PUF processor 608. For example, in certain implementations, the distance detection 1006 module may determine the distance between two random numbers using a hamming distance algorithm.

In certain implementations, the entropy evaluator 608 module may use a test suite 1008 module for determining the quality of the past random numbers generated by the RNG/PUF processor 608. For example, a standardized test suite for evaluating entropy for random numbers, such as test suite compliant with the NIST (National Institute of Standards and Technology) or a noise shaper may be used for evaluating entropy by the entropy evaluator 616 module.

The quality of the entropy for the random numbers generated by the RNG/PUF processor 608 module may be provided to the entropy controller 612 and/or the cryptographic system 620. In certain implementations, the cryptographic system 620 may use the quality of the random number generated by the RNG/PUF system 218 in determining on how to use the random number and also influence generation of future random numbers.

As described above, the entropy associated with the random numbers generated by the RNG/PUF system 218 may be dynamically configurable, either automatically or through user input. For example, where lower entropy is acceptable a lower entropy threshold may be identified to the RNG/PUF system 218 through the configuration 618 module. Generating a random number with lower entropy, in some instances, may require lower processing power and time. For example, for generating lower entropy, a lower sampling rate, less number of sources and a less processor intensive hashing algorithm (e.g., MD) may be used, resulting in less memory buffer usage, faster processing time and lower power consumption. For example, in some implementations a number generated with a entropy threshold similar to entropy provided by PUFs may be acceptable.

On the other hand, if an application requires random numbers with higher entropy, for example, in use in a payment application, the application via the cryptographic system 620 and the configuration 618 module may request a higher entropy threshold. Requesting a higher entropy threshold automatically reconfigures the sources selected, the sampling rate for the sources and the processing techniques used to increase the entropy of the random number generated. In some instance, generating higher entropy random numbers may consumer more power, require more processing and take a little longer than numbers with lower entropy.

Figure 11:
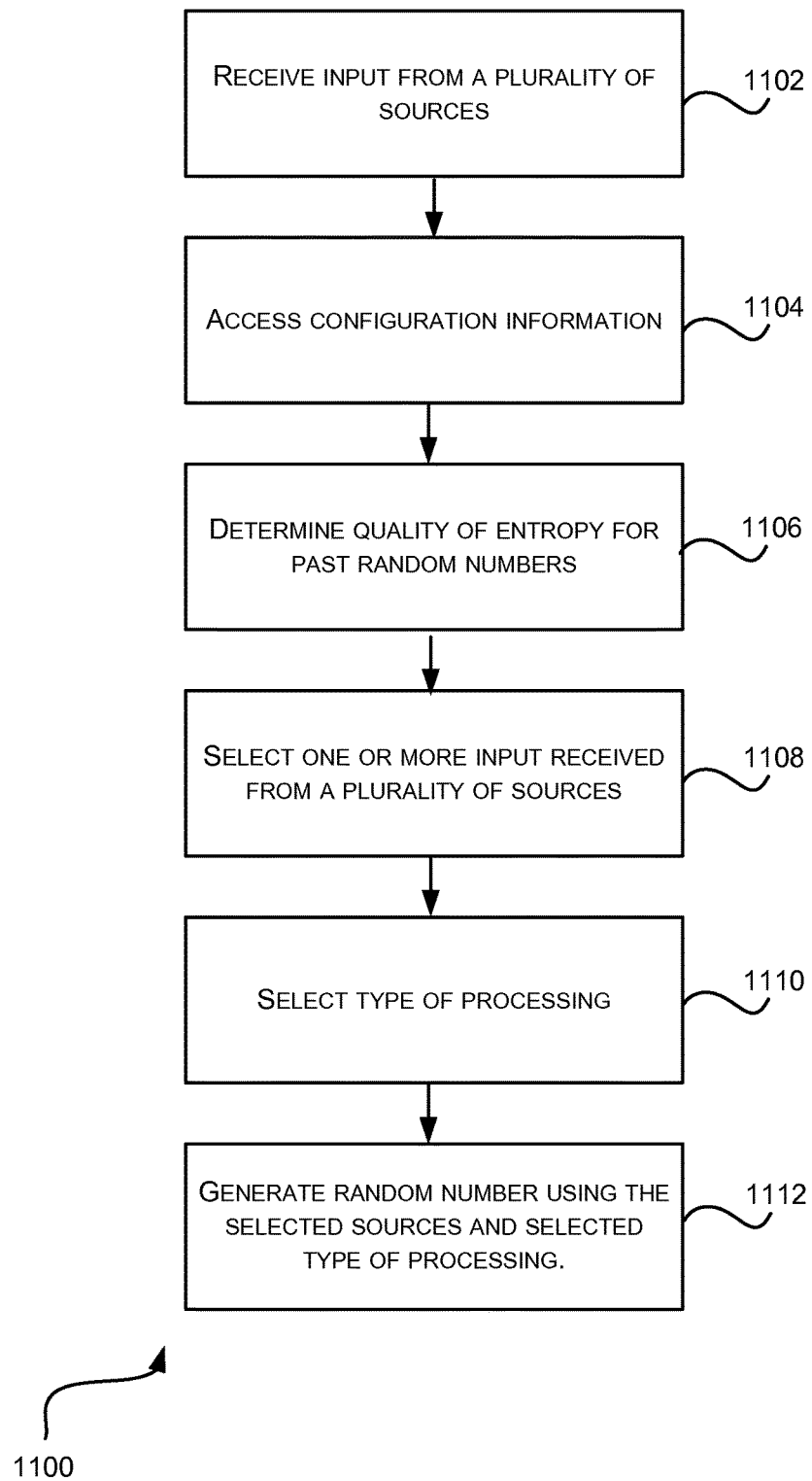
FIG. 11 illustrates an example flow diagram for implementing certain embodiments of the present disclosure.

FIG. 11 illustrates an exemplary flow diagram for installation of the application according to embodiments of the invention. The method 1100 is performed by processing logic that may include hardware (circuitry, dedicated logic, etc.), software (such as is run on a general purpose computing system or a dedicated machine), firmware (embedded software), or any combination thereof. In one embodiment, the method 1100 is performed by the device 100 of FIG. 1.

At step 1102, components of the computing device 100, such as a RNG/PUF system 218, may receive input from a plurality of entropy sources. Plurality of entropy sources, may include, but are not limited to virtualization events 402, system events 404, secure communication channel 406, system random events 408, and modem events. In certain embodiments, the RNG/PUF system 218 performing embodiments of the invention executes from within a virtualized environment.

At step 1104, components of the computing device 100, such as the RNG/PUF system 218, may access configuration information, such an entropy threshold, for the RNG/PUF system 218. In certain implementations, the configuration information is pre-defined by the programmer. In other implementations, the configuration information is provided by the user. In yet other implementations, the configuration information is influenced by the application using the random number generated by the RNG/PUF system 218.

At step 1106, components of the computing device 100, such as the RNG/PUF system 218, may determine quality of entropy of past random numbers. In certain implementations, duplicates, identifiable patterns, distance may be used in determining the quality of the entropy. In another implementation, a standardized suite of one or more tests may be used for determining the quality of the entropy associated with random numbers generated by the RNG/PUF system.

At step 1108, components of the computing device 100, such as the RNG/PUF system 218, may select one or more inputs received from the plurality of entropy sources for generating the random number. In one implementation, the selection of sources may be based on the configuration information and the past entropy.

At step 1110, components of the computing device 100, such as the RNG/PUF system 218, may select a type of processing. In one implementation, the selection of the type of processing is based on the configuration information and the quality of past entropy. For example, for achieving higher quality entropy a SHA-2 hashing mechanism may be used for processing the sources, instead of an MD hashing mechanism.

As step 1112, components of the device 100, such as the RNG/PUF system 218, may generate the random number using the selected sources and selected type of processing.

It should be appreciated that the specific steps illustrated in FIG. 11 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1100.

Figure 12:
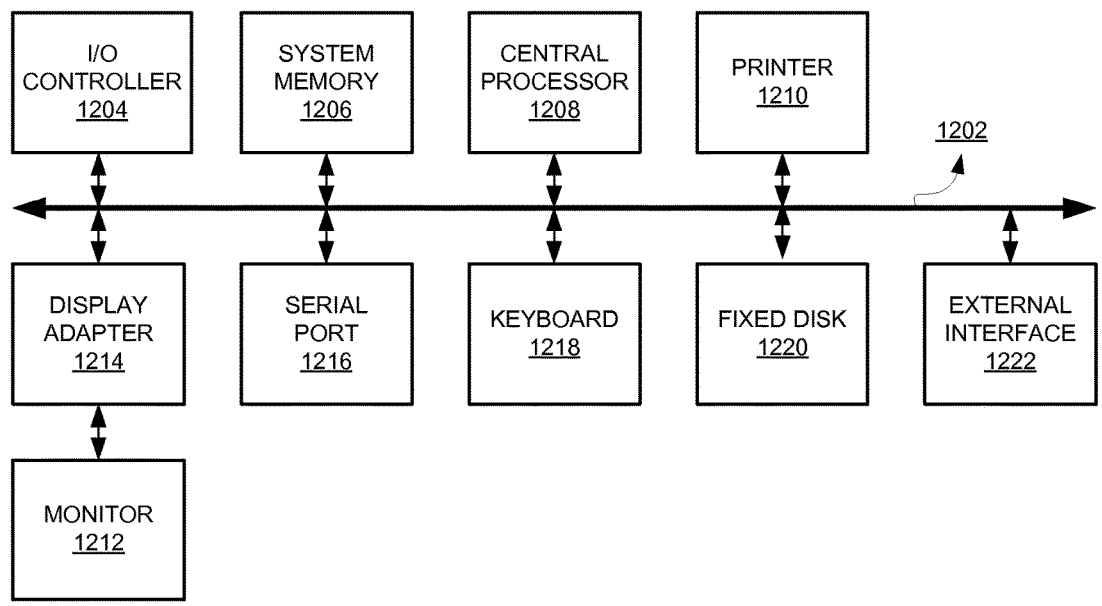
FIG. 12 is a high level block diagram of a computer system that may be used to implement any of the entities or components described herein.

FIG. 12 is a high level block diagram of a computer system that may be used to implement any of the entities or components described herein. The subsystems shown in FIG. 12 are interconnected via a system bus 1202. Additional subsystems include a printer 1210, keyboard 1218, fixed disk 1220, and monitor 1212, which is coupled to display adapter 1214. Peripherals and input/output (I/O) devices, which couple to I/O controller 1204, can be connected to the computer system by any number of means known in the art, such as a serial port. For example, serial port 1216 or external interface 1222 can be used to connect the computer apparatus to a wide area network such as the Internet, a mouse input device, or a scanner. The interconnection via system bus 1202 allows the central processor 1208 to communicate with each subsystem and to control the execution of instructions from system memory 1206 or the fixed disk 1220, as well as the exchange of information between subsystems. The system memory 1206 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
   receiving, at a mobile device, input from different types of entropy sources;
   determining, by the mobile device, past entropy using one or more previously generated random numbers by the mobile device using previously received input from the different types of entropy sources;
   selecting, at least one entropy source from the different types of entropy sources received at the mobile device, based on a comparison between an entropy threshold and the past entropy;
   generating, by the mobile device, a random number using the input from the at least one entropy source and the past entropy.

2. The method of claim 1, wherein generating the random number further comprises selecting a hashing mechanism for processing the at least one entropy source based on a comparison between an entropy threshold and the past entropy.

3. The method of claim 2, wherein the entropy threshold is provided by an application, wherein the application requests the generation of the random number.

4. The method of claim 1, wherein the at least one entropy source is a virtualization event.

5. The method of claim 1, wherein at least one entropy source is received over a secure communication channel from a second device.

6. The method of claim 1, wherein the input for the at least one entropy source comprises multiple inputs from the at least one entropy source accumulated over a period of time.

7. The method of claim 1, wherein determining the past entropy comprises providing a standardized entropy evaluation suite with the one or more past random numbers.

8. The method of claim 1, wherein determining the past entropy comprises determining the distance between the one or more past random numbers.

9. The method of claim 1, wherein the random number is generated in a virtualized environment.

10. A mobile device, comprising:
    a processor; and
    a computer readable medium coupled to the processor, the computer readable medium comprising code, executable by the processor for implementing a method comprising:
      receiving input from different types of entropy sources;
      determining entropy using one or more previously generated random numbers by the mobile device using previously received input from the different types of entropy sources;
      selecting, at least one entropy source from the different types of entropy sources received at the mobile device, based on a comparison between an entropy threshold and the past entropy;
      generating a random number using the input from the at least one entropy source and the past entropy.

11. The mobile device of claim 10, wherein generating the random number further comprises selecting a hashing mechanism for processing the at least one entropy source based on a comparison between an entropy threshold and the past entropy.

12. The mobile device of claim 10, wherein the entropy threshold is provided by an application, wherein the application requests the generation of the random number.

13. The mobile device of claim 10, wherein the at least one entropy source is a virtualization event.

14. The mobile device of claim 10, wherein at least one entropy source is received over a secure communication channel from a second device.

15. The mobile device of claim 10, wherein the input for the at least one entropy source comprises multiple inputs from the at least one entropy source accumulated over a period of time.

16. The mobile device of claim 10, wherein determining the past entropy comprises providing a standardized entropy evaluation suite with the one or more past random numbers.

17. The mobile device of claim 10, wherein determining the past entropy comprises determining the distance between the one or more past random numbers.

18. The mobile device of claim 10, wherein the random number is generated in a virtualized environment.

* * * * *

UNITED STATES PATENT AND TRADEMARK OFFICE
CERTIFICATE OF CORRECTION

PATENT NO. : 9,558,358 B2
APPLICATION NO. : 14/318046
DATED : January 31, 2017
INVENTOR(S) : Selim Aissi, Taeho Kgil and Gyan Prakash It is certified that error appears in the above-identified patent and that said Letters Patent is hereby corrected as shown below:

In the Claims

In Column 17, Claim 3, remove "The method of claim 2, wherein the entropy threshold is provided by an application, wherein the application requests the generation of the random number" and insert --The method of claim 1, wherein the entropy threshold is provided by an application, wherein the application requests the generation of the random number--

Signed and Sealed this
Second Day of January, 2018

Joseph Matal
*Performing the Functions and Duties of the*
*Under Secretary of Commerce for Intellectual Property and*
*Director of the United States Patent and Trademark Office*